United States Patent
Eliseo et al.

(10) Patent No.: US 10,938,956 B2
(45) Date of Patent: *Mar. 2, 2021

(54) PROCESSING COMMAND LINE TEMPLATES FOR DATABASE QUERIES

(71) Applicant: INTERNATIONAL BUSINESS MACHINES CORPORATION, Armonk, NY (US)

(72) Inventors: Jordan A. Eliseo, Austin, TX (US); Su Liu, Austin, TX (US); Andrew F. Ly, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,653

(22) Filed: Aug. 5, 2019

(65) Prior Publication Data

US 2019/0356757 A1      Nov. 21, 2019

Related U.S. Application Data

(63) Continuation of application No. 15/198,585, filed on Jun. 30, 2016, now Pat. No. 10,419,582.

(51) Int. Cl.
  *H04L 29/08*   (2006.01)
  *H04L 29/06*   (2006.01)
  *G06F 16/9032*   (2019.01)

(52) U.S. Cl.
  CPC ........ *H04L 67/34* (2013.01); *G06F 16/90324* (2019.01); *H04L 67/42* (2013.01)

(58) Field of Classification Search
  CPC .... H04L 67/34; H04L 67/42; G06F 16/90324
  See application file for complete search history.

(56) References Cited

U.S. PATENT DOCUMENTS 9,286,063 B2   3/2016   Kriegsman et al.
9,294,553 B1 *   3/2016   Vaswani ............. H04L 67/2847
(Continued)

FOREIGN PATENT DOCUMENTS

WO   2011047733 A1   4/2011

OTHER PUBLICATIONS

Shrestha, Narad. The Power of Linux "History Command" in Bash Shell. Tecmint.com, Jun. 14, 2013. [19 printed pages] <URL: http://www.tecmint.com/history-command-examples/>.

(Continued)

*Primary Examiner* — Michael A Keller
(74) *Attorney, Agent, or Firm* — The Steadman Law Firm PLLC

(57) ABSTRACT

An approach is described for processing command line templates for database queries. A method pertaining to such approach may include retrieving a set of command line templates based upon command line information received from a plurality of respective clients in a computing environment. The method further may include receiving a command line query from a first client among the plurality of respective clients and searching the set of command line templates based upon contents of the command line query. The method further may include transmitting to the first client at least one command line recommendation based upon the search. In an embodiment, retrieving the set of command line templates according to the method may include receiving from a centralized server at least one update with respect to the set of command line templates.

20 Claims, 5 Drawing Sheets

(56) References Cited

U.S. PATENT DOCUMENTS

| | | | |
|---|---|---|---|
| 9,684,561 B1* | 6/2017 | Yan | G06F 16/27 |
| 2003/0009685 A1* | 1/2003 | Choo | G06F 21/6218 726/27 |
| 2005/0091525 A1 | 4/2005 | Snover et al. | |
| 2008/0155565 A1 | 6/2008 | Poduri | |
| 2009/0037551 A1* | 2/2009 | Gupta | G06F 9/45512 709/208 |
| 2009/0059731 A1 | 3/2009 | Bull et al. | |
| 2010/0299305 A1 | 11/2010 | Laxman et al. | |
| 2011/0099147 A1* | 4/2011 | McAlister | G06F 11/2076 707/639 |
| 2012/0192096 A1* | 7/2012 | Bowman | G06F 3/0481 715/780 |
| 2012/0216135 A1 | 8/2012 | Wong et al. | |
| 2013/0139132 A1* | 5/2013 | Kass | G06F 8/447 717/139 |
| 2013/0179460 A1* | 7/2013 | Acuna | G06F 40/274 707/758 |
| 2014/0149455 A1 | 5/2014 | Carr et al. | |
| 2015/0172117 A1 | 6/2015 | Dolinsky et al. | |
| 2016/0070746 A1* | 3/2016 | Bender | G06F 16/2372 707/696 |
| 2017/0199770 A1 | 7/2017 | Peteva et al. | |
| 2017/0270091 A1* | 9/2017 | Singh | G06F 9/453 |

OTHER PUBLICATIONS

Snoopy Logger. GitHub. Accessed on Apr. 6, 2016. [5 printed pages]<URL: https://github.com/a2o/snoopy>.

Arlotta, CJ. IBM: Cloud Revenue Hit $7B In 2014. Talkin Cloud, Jan. 20, 2015. [4 printed pages] <URL: http://talkincloud.com/cloud-computing-funding-and-finance/01202015/ibm-q4-earnings-cloud-revenues-hit-7b-2014>.

Reportsnreports. IaaS Market: 42.9% CAGR for Infrastructure as a Service Industry Forecast to 2019 in a New Global Research Report. PRNewswire, Dec. 3, 2014. [7 printed pages] <URL: http://www.prnewswire.com/news-releases/iaas-market-429-cagr-for-infrastructure-as-a-service-industry-forecast-to-2019-in-a-new-global-research-report-284583391.html>.

Artra, Leeland. All of bash history forever and across multiple sessions. Natural Order Development, Oct. 26, 2011. [3 printed pages] <URL: http://nodsw.com/blog/leeland/2011/10/26-all-bash-history-forever-and-across-multiple-sessions>.

Inventory—IBM UrbanCode Deploy. IBM developerWorks. Accessed on Jun. 29, 2016. [5 printed pages] <URL: https://developer.ibm.com/urbancode/products/urbancode-deploy/features/inventory/>.

How do you share zsh history between multiple machines? Stack Overflow. Accessed on Apr. 6, 2016. [1 printed page] <URL: http://stackoverflow.com/questions/10508052/how-do-you-share-zsh-history-between-multiple-machines>.

Is there a Windows command line with smart bash-like autocompletions / command history? Super User. Accessed on May 19, 2016. [5 printed pages] <URL: http://superusercom/questions/327401/is-there-a-windows-command-line-with-smart-bash-like-autocompletions-command-h>.

Advanced command history in Linux? Ars Technica. Accessed on Apr. 6, 2016. [5 printed pages] <URL: http://arstechnica.com/civis/viewtopic.php?f=16&t=130526>.

The Console Component. Symfony, a SensioLabs Product. Accessed on Jun. 30, 2016. [16 printed pages] <URL: http://symfony.com/doc/current/components/console/introduction.html>.

List of IBM Patents or Patent Applications Treated as Related, Aug. 5, 2019. [2 pages].

* cited by examiner

PROCESSING COMMAND LINE TEMPLATES FOR DATABASE QUERIES

BACKGROUND

The various embodiments described herein generally relate to command line processing. More specifically, the various embodiments describe techniques of processing command line templates for database queries.

Efficiency is important in the context of development and operations (i.e., DevOps) and system administration, particularly in the context of database command processing within a computing environment. Certain command lines may be used multiple times by various clients upon accessing servers for queries. Repeated client entry of command lines may result in unnecessary expenditure of time and other resources. Moreover, command lines may be difficult to recall for repeated use if no accessible record of the command line exists.

SUMMARY

The various embodiments described herein provide techniques of processing command line templates for database queries. An associated method may include retrieving a set of command line templates based upon command line information received from a plurality of respective clients in a computing environment. The set of command line templates may be retrieved via a processor. Each of the set of command line templates may include computing environment information or at least one command with associated parameters. The method further may include receiving a command line query from a first client among the plurality of respective clients and searching the set of command line templates based upon contents of the command line query. The method further may include transmitting to the first client at least one command line recommendation based upon the search. According to an embodiment, transmitting to the first client the at least one command line recommendation may include prioritizing any command line recommendation reflective of any prior command line activity of the first client.

In an embodiment, the method further may include, responsive to the first client selecting a command line recommendation among the at least one command line recommendation, executing a client command associated with the selected command line recommendation. In another embodiment, the method further may include, responsive to the first client submitting a client command inconsistent with each of the at least one command line recommendation, saving aspects of the client command as at least one update with respect to the set of command line templates. According to such embodiment, the method further may include sending to a centralized server the at least one update with respect to the set of command line templates. Furthermore, according to such embodiment, the method further may include executing the client command inconsistent with each of the at least one command line recommendation.

In an embodiment, the method step of retrieving the set of command line templates may include receiving from a centralized server at least one update with respect to the set of command line templates. In a further embodiment, the contents of the command line query may include at least one keyword. According to such embodiment, the method step of searching the set of command line templates may include searching manual page descriptions of commands associated with the set of command line templates, searching the commands associated with the set of command line templates and other descriptions associated with the commands (beyond the manual page descriptions), and returning any result determined to be related to the at least one keyword based upon the searches. In another embodiment, the method further may include categorizing respective templates among the set of command line templates.

An additional embodiment includes a computer program product including a computer readable storage medium having program instructions embodied therewith, wherein the program instructions may be executable by a computing device to cause the computing device to perform one or more steps of above recited method. A further embodiment includes a system having a processor and a memory storing an application program, which, when executed on the processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1A:
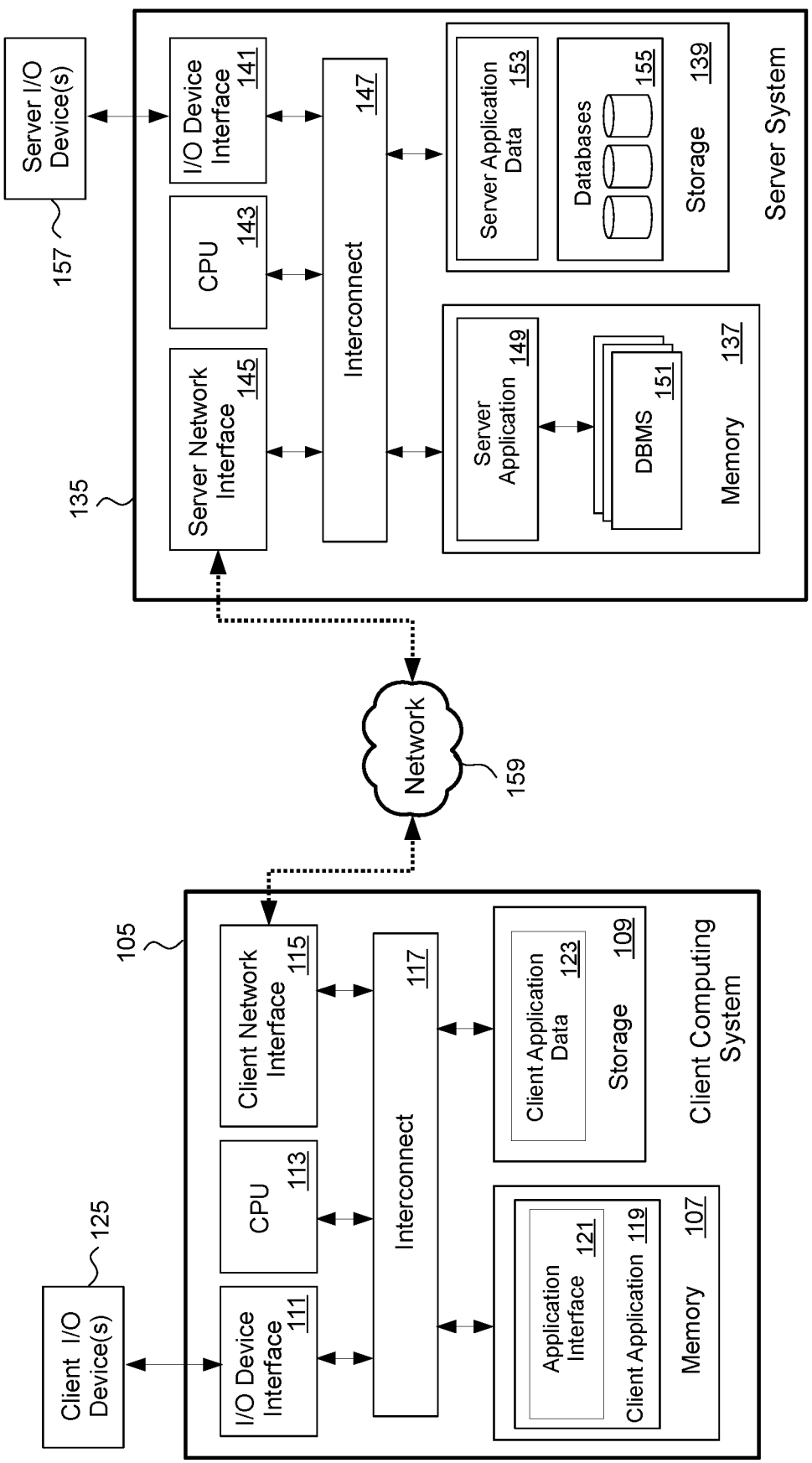
FIG. 1A illustrates a client-server view of a computing infrastructure, according to an embodiment.

The various embodiments described herein are directed to techniques for processing command line templates for database queries. The various embodiments focus in particular upon retrieving, searching, and updating a set of command line templates in the context of database queries submitted to respective server systems by respective clients. The set of command line templates may be propagated and updated via a centralized server connected to the respective server systems via a network.

The various embodiments described herein may have advantages over conventional techniques. Specifically, the various embodiments may provide a client the ability to obtain a command line without having to recall specific details associated with the desired command. Entry of a keyword in a query may suffice for command execution. Moreover, the various embodiments may provide a client the ability to enter and submit a commonly-used command line to a server in a relatively short amount of time. Furthermore, the various embodiments provide the ability to share command line template information among multiple servers, and in turn the servers may provide such information to respective clients. Additionally, the various embodiments may provide a client the ability to log details of command lines from any server, and such details may be relayed to a centralized server or to other servers. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client computing system or server system running an application according to the various embodiments described herein may be deployed to a computing cloud. Moreover, cloud-based database systems, virtual machines, and a variety of other server applications may be used to manage such workloads.

Particular embodiments describe techniques for processing command line templates. However, it should be understood that the techniques described herein may be adapted to a variety of purposes in addition to those specifically described herein. Accordingly, references to specific embodiments are included to be illustrative and not limiting.

FIG. 1A illustrates a client-server view of a computing infrastructure 100, according to an embodiment. As shown, computing infrastructure 100 includes a client computing system 105 and a server system 135, each of which may be connected to a communications network 159.

Illustratively, client computing system 105 may include a memory 107, storage 109, client input/output (I/O) device interface 111, a central processing unit (CPU) 113, and a client network interface 115, all of which may be interconnected via interconnect 117 (e.g., a bus). Although shown as a single computing system, client computing system 105 is included to be representative of a single client or multiple clients. In an embodiment, client computing system 105 may be a thin client. Memory 107 may include a client application 119. Client application 119 may be an online or network application configured for interfacing with server system 135 and other computing systems. Client application 119 may include an application interface 121. Storage 109 may include client application data 123 associated with client application 119. Client I/O device interface 111 may be communicatively coupled to one or more client I/O devices 125. CPU 113 is included in FIG. 1A to be representative of a single CPU, multiple CPUs, a single CPU having multiple processing cores, and the like. Client network interface 115 may receive data from, and may transmit data to, server system 135 via network 159. Client computing system 105 may be configured to interface with other server systems in computing infrastructure 100.

Server system 135 may include a memory 137, storage 139, server I/O device interface 141, a CPU 143, and a server network interface 145, all of which may be interconnected via interconnect 147 (e.g., a bus). Although shown as a single computing system, server system 135 is included to be representative of a single server system or multiple server systems. Memory 137 may include a server application 149 and a database management system (DBMS) 151. As further described herein, server application 149 may be an application for processing command line templates and associated commands. DBMS 151 is included be representative of a single database management system or multiple database management systems. Storage 139 may include server application data 153 and databases 155. Server application 149 may generate and process server application data 153 based upon interaction with client computing system 105. Server application 149 may send to DBMS 151 a database query request (e.g., a query received from client computing system 105), and DBMS 151 may process such query. DBMS 151 may include a software application configured to manage databases 155. Databases 155 may include one or more relational databases. Additionally, databases 155 may include one or more ontology trees or other ontological structures. While FIG. 1A illustrates three databases 155, computing infrastructure 100 may include any number of databases. According to an embodiment, DBMS 151 may send one or more requests to remote databases (not shown) via network 159.

Server I/O device interface 141 may be communicatively coupled to one or more server I/O devices 157. CPU 143 is included in FIG. 1A to be representative of a single CPU, multiple CPUs, a single CPU having multiple processing cores, and the like. Server network interface 145 may receive data from, and may transmit data to, client computing system 105 via network 159. Specifically, server application 149 may accept requests sent by client computing system 105 to server system 135 and further may transmit data to client computing system 105 via server network interface 145.

In a further alternative embodiment, functions related to command line template processing may be executed externally to server system 135. According to such alternative embodiment, server application 149 may communicate with applications external to server system 135 in order to obtain information or results related to command line template processing. Furthermore, according to such alternative embodiment, a database management system and one or more databases external to server system 135 may provide to server application 149 or other components of server system 135 information or capabilities necessary for command line template processing.

Figure 1B:
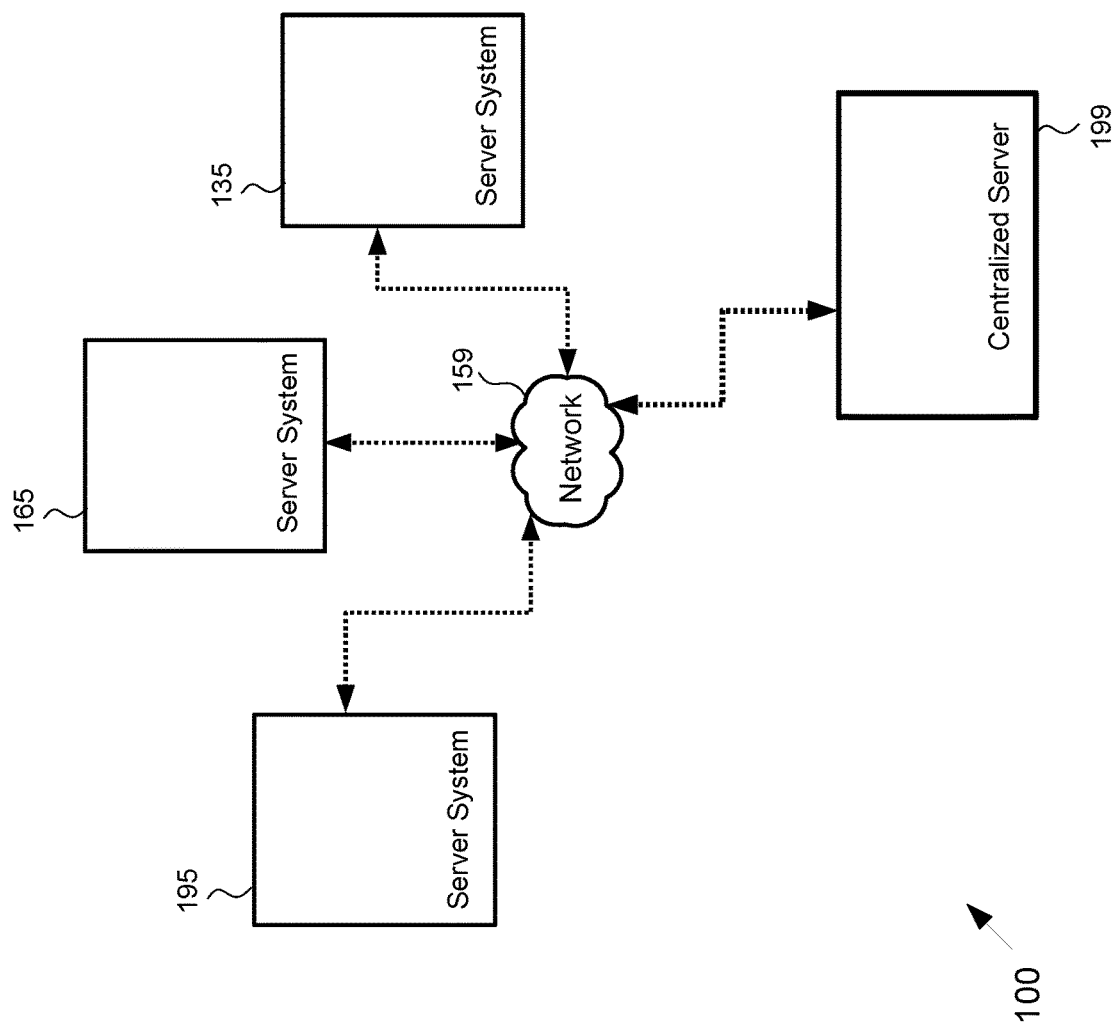
FIG. 1B illustrates a multiple server view of the computing infrastructure illustrated in FIG. 1A, according to an embodiment.

FIG. 1B illustrates a multiple server view of computing infrastructure 100 according to an embodiment. As illustrated, in addition to server system 135, computing infrastructure 100 further may include server systems 165 and 195, each of which may be connected to network 159. Similarly to server system 135, server systems 165 and 195 each may interface with one or more client computing systems. Furthermore, a single client computing system may interface with more than one of server systems 135, 165, and 195. Although server systems 135, 165, and 195 are illustrated in FIG. 1B, computing infrastructure 100 may include any number of server systems. Computing infrastructure 100 further may include a centralized server 199 connected to network 159. One or more of server systems 135, 165, and 195 may send updates to, and may receive updates from, centralized server 199. Such updates may include command line template updates in accordance with the various embodiments described herein.

Figure 2:
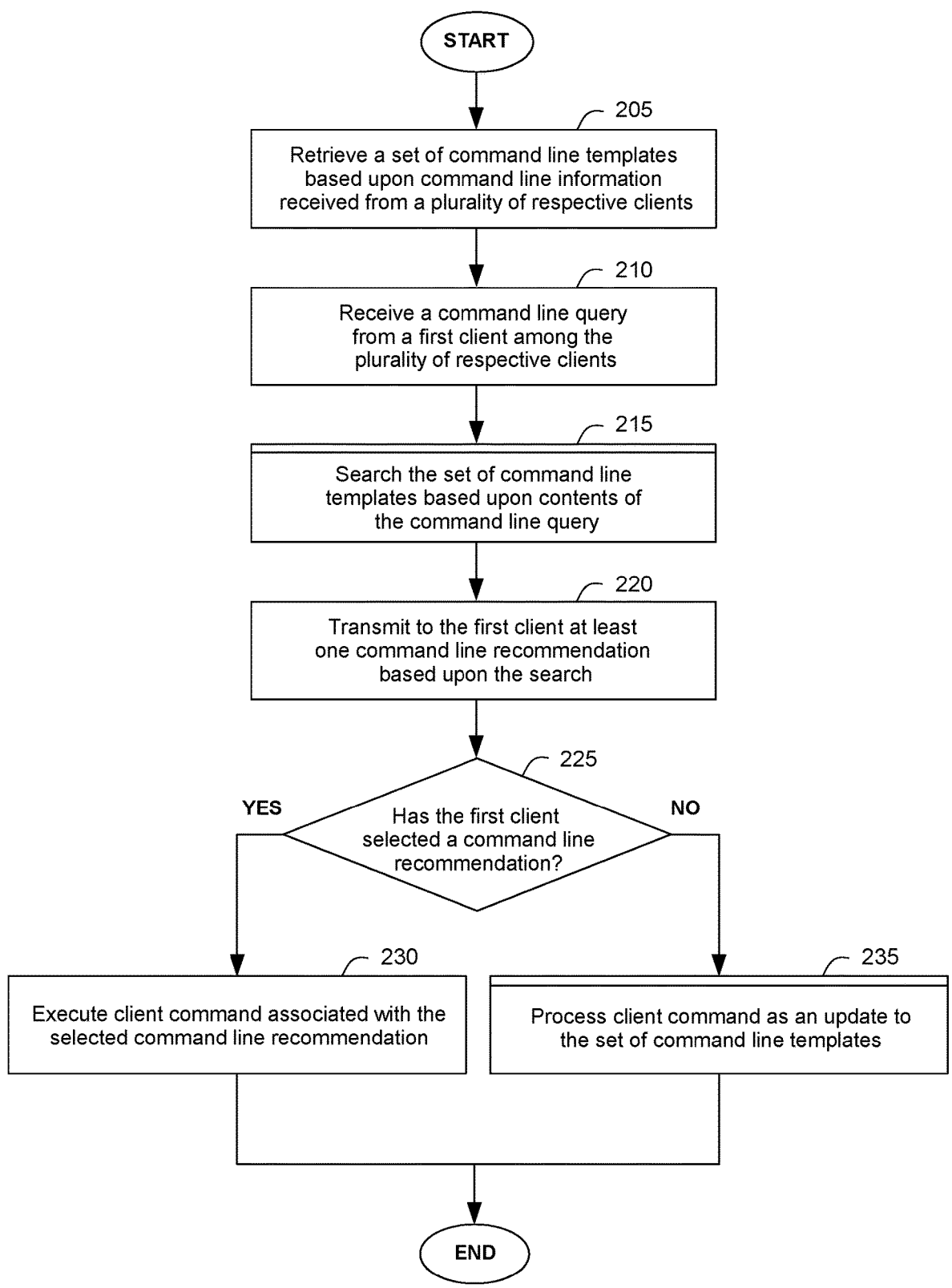
FIG. 2 illustrates a method of processing command line templates for database queries, according to an embodiment.

FIG. 2 illustrates a method 200 of processing command line templates for database queries, according to an embodiment. Steps associated with the method 200 may be carried out in a client-server computing environment (e.g., computing infrastructure 100). Additionally or alternatively, steps associated with the method 200 may be carried out within one or more workloads of a cloud computing environment. A server application (e.g., server application 149) may facilitate processing according to the method 200. The server application may be configured to process command line templates based upon client queries. The server application may be located in a server system in the computing environment (e.g., server system 135). The method 200 may begin at step 205, where the server application may retrieve a set of command line templates based upon command line information received from a plurality of respective clients in the computing environment. The set of command line templates may be stored within server application data of the server system (e.g., server application data 153). The server application may retrieve the set of command line templates via a processor of the server system (e.g., CPU 143), which may process the set of command line templates upon receipt from a communications network (e.g., network 159) via a server network interface of the server system (e.g., server network interface 145).

In an embodiment, each of the set of command line templates may include computing environment information or at least one command with associated parameters. The computing environment information may include information regarding an operating system or an application associated with at least one client capable of interfacing with the server system. According to such embodiment, each of the set of command line templates may include all information necessary for a client to select at least one database command or other server-compatible command for execution. For example, one or more command line templates among the set of command line templates may provide command line information necessary to execute a delete database command, and one or more additional command line templates may provide command line information necessary to execute a modify database command. According to such example, other database commands, including create, import, and export, may be represented by respective command line templates among the set of command line templates. In a further embodiment, each of the set of command line templates may be categorized according to the type of command to be executed (e.g., read command, write command, etc.). According to such embodiment, each of the command line templates may be organized based upon command objective. In a further embodiment, one or more of the set of command line templates may include a portion for storing user descriptions provided for the associated command. For instance, a client may prefer to provide a custom name or other descriptive information to be associated with one or more of the set of command line templates. According to a further embodiment, in retrieving the set of command line templates, the server application may receive from a centralized server (e.g., centralized server 199) at least one update with respect to the set of command line templates. The at least one update received from the centralized server may include updates provided to the centralized server from one or more other server systems in the computing environment. Such updates provided to the centralized server may be based upon commands submitted to the one or more other server systems by clients among the plurality of respective clients in the computing environment.

At step 210, the server application may receive a command line query from a first client among the plurality of respective clients (e.g., client computing system 105). More specifically, the server application may receive the command line query from a client application of the first client (e.g., client application 119). Furthermore, the first client may enter the command line query via an application interface of the client application (e.g., application interface 121). At step 215, the server application may search the set of command line templates based upon contents of the command line query. In an embodiment, the server application may use natural language processing to parse the contents of the command line query in order to compare contents of the command line query to contents within the set of command line templates. Additionally or alternatively, the server application may consult databases (e.g., databases 155) via a database management system (e.g., DBMS 151) in order to facilitate the search of the set of command line templates. In a further embodiment, the contents of the command line query may include at least one keyword, and the server application may search the set of command line templates based upon the at least one keyword. An embodiment pertaining to searching the set of command line templates based upon at least one keyword of a command line query is described further herein in a method 300.

At step 220, the server application may transmit to the first client at least one command line recommendation based upon the search. The server application may transmit the at least one command line recommendation via the communications network. In an embodiment, in transmitting to the first client the at least one command line recommendation, the server application may prioritize any command line recommendation reflective of any prior command line activity of the first client. According to such embodiment, the server application may prominently present to the first client any command line recommendation that may be most pertinent to the first client. For instance, the server application may present a command line recommendation reflective of recent activity of first client most prominently in a list of results including at the at least one command line recommendation. In an embodiment, the at least one command line recommendation may reflect one or more of the set of command line templates. According to such embodiment, aspects of one or more of the set of command line templates may be presented within a graphical user interface (GUI) of the client application. Additionally or alternatively, aspects of one or more of the set of command line templates may be presented within a command line interface of the client application. Such GUI or command line interface may form part of a query results portion of the application interface of the client application.

At step 225, server application may determine whether the first client has selected a command line recommendation among the at least one command line recommendation. Responsive to the first client selecting a command line recommendation among the at least one command line recommendation, at step 230 the server application may execute a client command associated with the selected command line recommendation. In an embodiment, the server application may ensure that the executed client command includes any parameters or special instructions provided by the first client in the command line query received at step 210. In a further embodiment, the server application may ensure that the client command is executed in such a way that is compatible with the computing environment of the first client (e.g., the client operating system or the client application of the first client). According to an embodiment, and as further described herein, the selected command line recommendation may be associated with multiple commands, in which case the server application may execute the multiple commands at step 230.

Responsive to the first client not selecting a command line recommendation among the at least one command line recommendation but rather submitting to the server application a client command inconsistent with each of the at least one command line recommendation, at step 235 the server application may process the client command as an update to the set of command line templates. An embodiment pertaining to processing a client command as an update to the set of command line templates according to step 235 is described further herein in a method 400. According to an embodiment, the first client may enter multiple commands simultaneously, in which case the server application may process the multiple commands at step 235.

In an embodiment, at step 205 the server application may retrieve usage statistics along with the set of command line templates. The usage statistics may include data with respect to frequency of command use among the respective clients of the computing environment. According to such embodiment, upon completing the steps of the method 200, the server application may update the usage statistics and may send to the centralized server the updated usage statistics along with any other updates related to the set of command line templates. According to such embodiment, each of the set of command line templates may be categorized according to how often the command associated with the command line template is used among respective clients in the computing environment. The usage statistics may include at least one metric indicating a most commonly executed command, or a group including a predetermined quantity of most commonly executed commands, among the respective clients of the computing environment. Additionally or alternatively, the server application may retrieve and update usage statistics specific to the first client. For instance, the server application may track the command most commonly executed by the first client.

In a further embodiment, a plurality of command line templates among the set of command line templates may be organized in a table. According to such embodiment, at step 220 the server application may present at least one table among the at least one command line recommendation. In such case, the first client may select a table among the at least one command line recommendation such that at step 230 the server application may execute multiple commands corresponding to the plurality of command line templates in the table. Thus, according to such embodiment, the first client may select multiple commands for execution simultaneously.

In a further embodiment, a plurality of commands recently executed by the first client (e.g., executed simultaneously or executed successively) may be organized in a table to be saved among the set of command line templates. According to such embodiment, the server application may process the plurality of client commands as a table update to the set of command line templates. In the context of the method 200, the server application may process such table update at step 235 responsive to the first client not selecting a command line recommendation among the at least one command line recommendation following multiple command line queries. In such case, the server application may save the commands executed following the multiple command line queries as a table update to the set of command line templates. For instance, the server application may execute a start save <new_table> database command, which may save commands executed following the multiple command line queries to a new table. Thus, according to such embodiment, system administrators may present multiple command line queries corresponding to a series of commands to set up client computing systems. In response, the server application may save the series of commands to a new table, which the server application in turn may save as a table update to the set of command line templates.

In a further embodiment, the first client may submit one or more command line queries to one or more other server systems in the computing environment (e.g., server system 165 or server system 195). According to such embodiment, respective server applications of the other server systems may retrieve the set of command line templates from the centralized server and may carry out other steps of the method 200. Hence, the first client need not be tied to a single server system but rather may submit queries and execute commands based upon the set of command line templates via multiple server systems in the computing environment.

Figure 3:
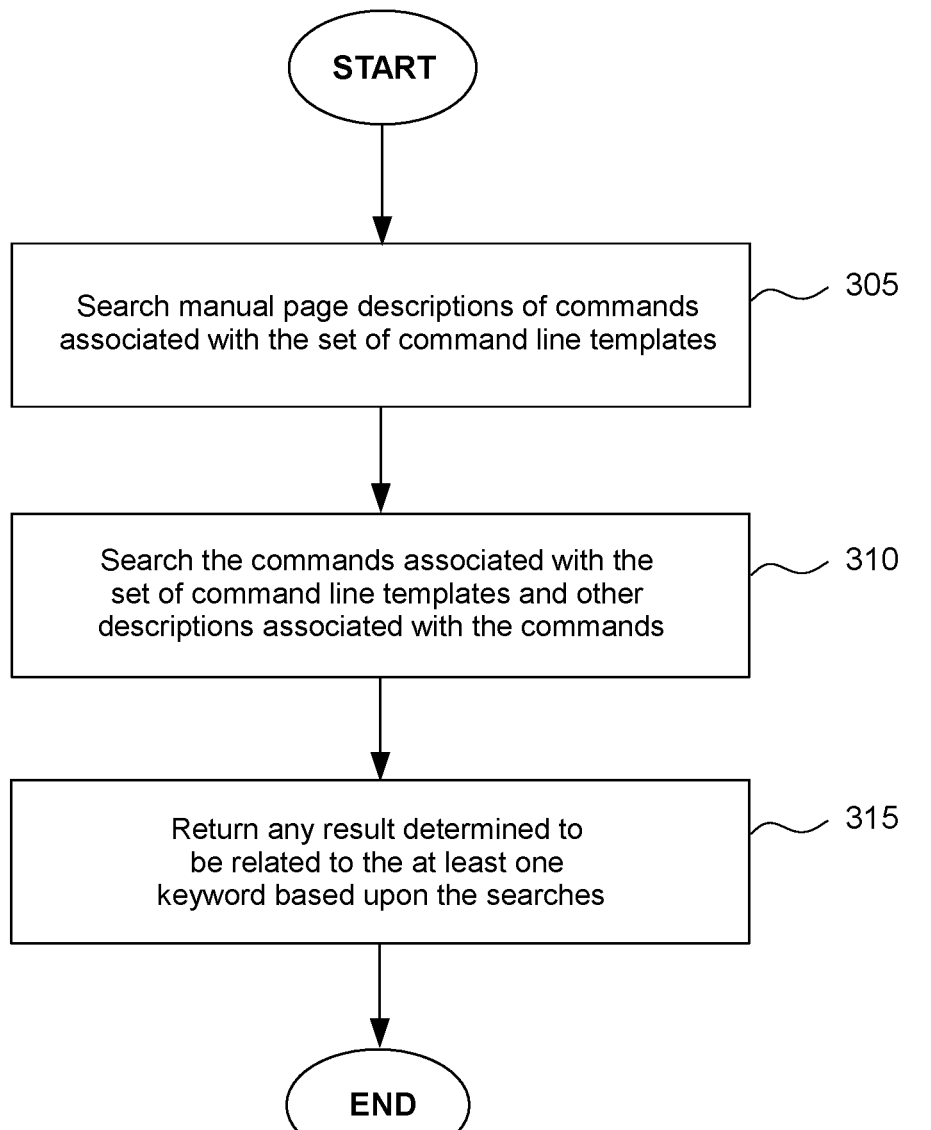
FIG. 3 illustrates a method of searching a set of command line templates based upon at least one keyword of a command line query, according to an embodiment.

FIG. 3 illustrates method 300 of searching the set of command line templates based upon at least one keyword of a command line query. The method 300 provides an example embodiment with respect to step 215 of the method 200. The method 300 may begin at step 305, where the server application may search manual page descriptions of commands associated with the set of command line templates to find any relation to the at least one keyword. At step 310, the server application may search the commands associated with the set of command line templates and other descriptions associated with the commands, i.e., descriptions other than any manual page descriptions searched at step 305, to find any relation to the at least one keyword. According to step 310, the server application may search the language of the commands, the language of any parameters of the commands, and/or any metadata associated with the commands. At step 315, the server application may return any result determined to be related to the at least one keyword based upon the searches at steps 305 and 310. Any such result may include any command line template among the set of command line templates that the server application determines to be related to the at least one keyword. In the context of the method 200, any such command line template returned at step 315 may be part of the at least one command line recommendation transmitted at step 220. In an embodiment, the server application may determine a result related to the at least one keyword by comparing language within each of the set of command line templates to the at least one keyword and then identifying command line templates having language matching the at least one keyword. In a further embodiment, the server application may determine a result related to the at least one keyword by determining one or more command objectives associated with the at least one keyword and then identifying any command line templates classified according to the one or more command objectives.

For instance, according to the method 300, upon receipt of keyword "disk" in a command line query, at step 305 the server application may search manual page descriptions of commands associated with the set of command line templates to find any relation to the keyword "disk", and at step 310 the server application may search the commands associated with the set of command line templates and descriptions other than the manual page descriptions searched at step 305 to find any relation to the keyword "disk". At step 315 the server application may return any result related to the keyword "disk" to the sender of the command line query (e.g., the first client in the context of the method 200). Any such result may include any command line template among the set of command line templates that the server application determines to be related to the keyword "disk". Thus, according to the method 300, a sender of a command line query may obtain information necessary to submit a command line simply by entering one or more keywords.

Figure 4:
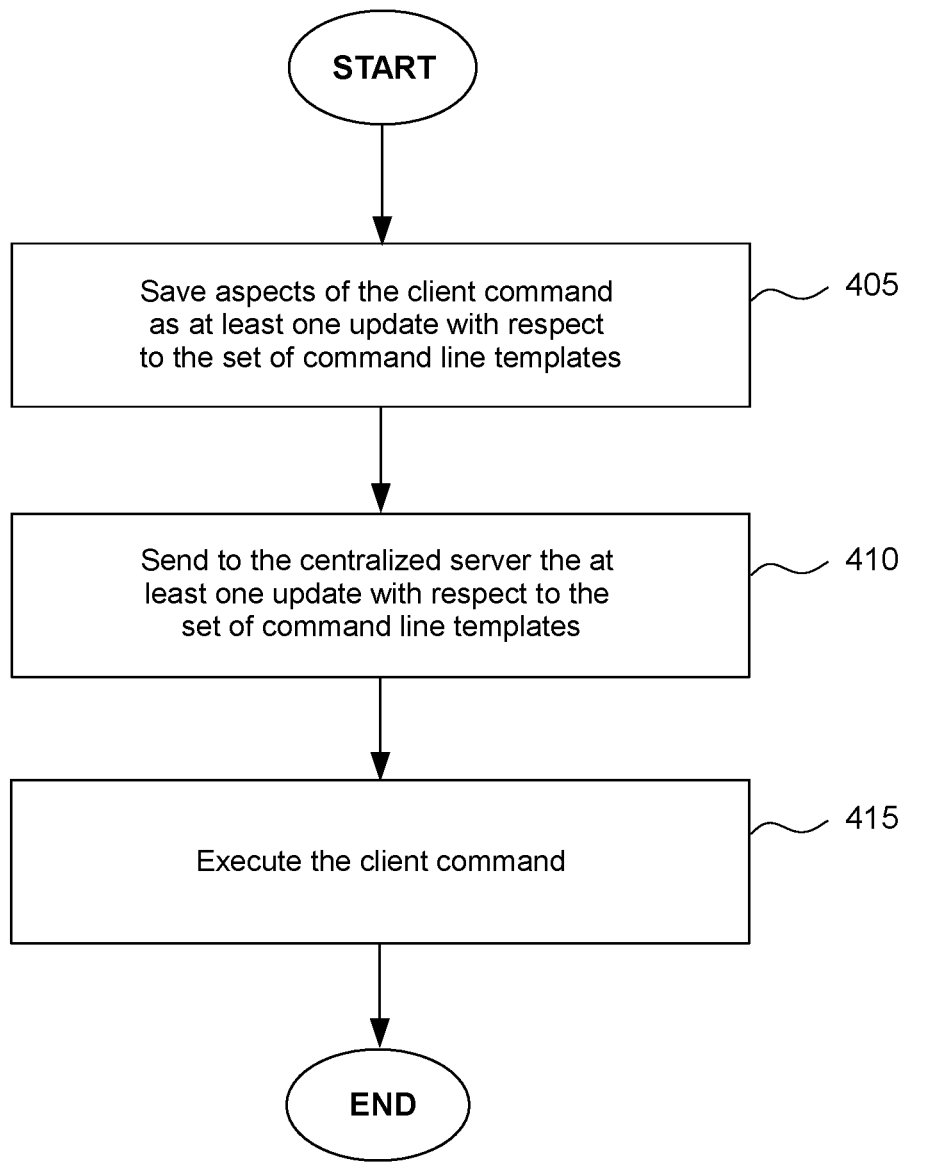
FIG. 4 illustrates a method of processing a client command as an update to a set of command line templates, according to an embodiment.

FIG. 4 illustrates method 400 of processing a client command as an update to the set of command line templates. The method 400 provides an example embodiment with respect to step 235 of the method 200. The method 400 may begin at step 405, where the server application may save aspects of the client command as at least one update with respect to the set of command line templates. In an embodiment, the server application may save aspects of the client command as a new command line template to be added to the set of command line templates. In an alternative embodiment, the server application may save aspects of the client command as a new extension of one or more already existing command line templates among the set of command line templates. According to an embodiment, the server application further may save, as part of the at least one update, client computing environment information, client-provided description information, and/or usage statistics associated with the command. At step 410, the server application may send to the centralized server the at least one update with respect to the set of command line templates. Once the server application sends the at least one update to the centralized server, the centralized server may arrange to transmit the at least one update to one or more other server systems in the computing environment. At step 415, the server application may execute the client command. In an embodiment, the server application may execute the client command according to step 415 prior to processing the at least one update according to steps 405 and 410.

In an embodiment, the centralized server regularly may poll the server system as well as other server systems in the computing environment in order to obtain any updates to the set of command line templates. Accordingly, the centralized server may ensure that recent updates to the set of command line templates are consistently available for retrieval by any server system in the computing environment. Hence, according to such embodiment, a server system consistently may access updates made remotely at other server systems by retrieving the set of command line templates from the centralized server on a periodic basis, and such server system in turn may process such updates for any client interfacing with the server system.

The various embodiments described herein may provide a set of command line templates to facilitate client entry of commonly-used command lines. Furthermore, the various embodiments may enable such set of command line templates to be propagated among multiple server systems via a centralized server. Additionally, the various embodiments may enable respective clients to provide updates to the set of command line templates.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description, and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
retrieving, via a processor, a set of command line templates based upon command line information received from a plurality of respective clients in a computing environment, wherein each of the set of command line templates includes information necessary to execute at least one server-compatible command pertaining to database modification, creation, importation, or exportation;
receiving a command line query from a first client among the plurality of respective clients;
searching the set of command line templates based upon contents of the command line query; and
transmitting to the first client, via a network, at least one command line recommendation based upon the search.

2. The method of claim 1, further comprising, responsive to the first client selecting a command line recommendation among the at least one command line recommendation, executing a client command associated with the selected command line recommendation.

3. The method of claim 1, further comprising, responsive to the first client submitting a client command inconsistent with each of the at least one command line recommendation, saving aspects of the client command as at least one update with respect to the set of command line templates.

4. The method of claim 3, further comprising, responsive to the first client submitting the client command inconsistent with each of the at least one command line recommendation, sending to a centralized server the at least one update with respect to the set of command line templates.

5. The method of claim 1, further comprising, responsive to the first client submitting a client command inconsistent with each of the at least one command line recommendation, executing the client command.

6. The method of claim 1, wherein retrieving the set of command line templates comprises receiving from a centralized server at least one update with respect to the set of command line templates.

7. The method of claim 6, wherein the centralized server is configured to obtain any updates with respect to the set of command line templates by polling a plurality of server systems in the computing environment.

8. The method of claim 1, wherein each of the set of command line templates includes computing environment information or at least one command with associated parameters.

9. The method of claim 1, wherein the contents of the command line query include at least one keyword, and wherein searching the set of command line templates comprises:
searching manual page descriptions of commands associated with the set of command line templates;
searching the commands associated with the set of command line templates and other descriptions associated with the commands; and
returning any result determined to be related to the at least one keyword based upon the searches.

10. The method of claim 1, further comprising categorizing respective templates among the set of command line templates.

11. The method of claim 1, wherein transmitting to the first client the at least one command line recommendation comprises prioritizing any command line recommendation reflective of any prior command line activity of the first client.

12. The method of claim 1, wherein one or more of the set of command line templates include a portion for storing client-provided descriptive information.

13. The method of claim 1, further comprising:
retrieving usage statistics including data with respect to frequency of command use among the plurality of respective clients in the computing environment.

14. The method of claim 1, wherein searching the set of command line templates comprises:
searching command aspects associated with the set of command line templates; and
returning any result determined to be related to at least one keyword in the command line query consequent to determining one or more command objectives associated with the at least one keyword and identifying any command line templates classified according to the one or more command objectives.

15. A computer program product comprising a computer readable storage medium having program instructions embodied therewith, the program instructions executable by a computing device to cause the computing device to:
retrieve a set of command line templates based upon command line information received from a plurality of respective clients in a computing environment, wherein each of the set of command line templates includes information necessary to execute at least one server-compatible command pertaining to database modification, creation, importation, or exportation;
receive a command line query from a first client among the plurality of respective clients;
search the set of command line templates based upon contents of the command line query; and
transmit to the first client, via a network, at least one command line recommendation based upon the search.

16. The computer program product of claim 15, wherein the program instructions, responsive to the first client selecting a command line recommendation among the at least one command line recommendation, further cause the computing device to execute a client command associated with the selected command line recommendation.

17. The computer program product of claim 15, wherein the program instructions, responsive to the first client submitting a client command inconsistent with each of the at least one command line recommendation, further cause the computing device to save aspects of the client command as at least one update with respect to the set of command line templates.

18. A system comprising:
a processor; and
a memory storing an application program, which, when executed on the processor, performs an operation comprising:
retrieving a set of command line templates based upon command line information received from a plurality of respective clients in a computing environment, wherein each of the set of command line templates includes information necessary to execute at least one server-compatible command pertaining to database modification, creation, importation, or exportation;
receiving a command line query from a first client among the plurality of respective clients;
searching the set of command line templates based upon contents of the command line query; and
transmitting to the first client, via a network, at least one command line recommendation based upon the search.

19. The system of claim 18, wherein the operation further comprises, responsive to the first client selecting a command line recommendation among the at least one command line recommendation, executing a client command associated with the selected command line recommendation.

20. The system of claim 18, wherein the operation further comprises, responsive to the first client submitting a client command inconsistent with each of the at least one command line recommendation, saving aspects of the client command as at least one update with respect to the set of command line templates.

* * * * *